(12) United States Patent
Craddock et al.

(10) Patent No.: US 12,129,838 B2
(45) Date of Patent: Oct. 29, 2024

(54) FUSION THRUSTER

(71) Applicants: Christopher Craddock, Chappaqua, NY (US); Wesley Faler, Tampa, FL (US)

(72) Inventors: Christopher Craddock, Chappaqua, NY (US); Wesley Faler, Tampa, FL (US)

( * ) Notice: Subject to any disclaimer, the term of this patent is extended or adjusted under 35 U.S.C. 154(b) by 0 days.

(21) Appl. No.: 18/218,561

(22) Filed: Jul. 5, 2023

(65) Prior Publication Data

US 2024/0018950 A1 Jan. 18, 2024

Related U.S. Application Data

(60) Provisional application No. 63/358,740, filed on Jul. 6, 2022.

(51) Int. Cl.
*F03H 1/00* (2006.01)
(52) U.S. Cl.
CPC ......... *F03H 1/0012* (2013.01); *F03H 1/0087* (2013.01)
(58) Field of Classification Search
CPC ............................ F03H 1/0012; F03H 1/0087
See application file for complete search history.

(56) References Cited

U.S. PATENT DOCUMENTS

| | | | |
|---|---|---|---|
| 9,822,769 B2 | 11/2017 | Cohen et al. | |
| 10,384,813 B2 | 8/2019 | Drexler | |
| 11,469,002 B2 | 10/2022 | Wong et al. | |
| 2008/0061191 A1 | 3/2008 | Gochnour | |
| 2009/0000268 A1 | 1/2009 | Yurash | |
| 2011/0200153 A1 | 8/2011 | Ferreira, Jr. | |
| 2022/0055774 A1 | 2/2022 | Hora | |

FOREIGN PATENT DOCUMENTS

EP 3275291 B1 1/2019

OTHER PUBLICATIONS

Wikipedia Fusion Power (Year: 2021).*
Wikipedia Fusor (Year: 2021).*
Wikipedia Polywell (Year: 2021).*
MA. Determination of Boron Content and Isotopic Composition in Gypsum by Inductively Coupled Plasma Optical Emission Spectroscopy and Positive Thermal Ionization Mass Spectros.
Lloyd. Application of 1013 Ohm Faraday Cup Current Amplifiers for Boron Isotopic Analyses by Solution Mode and Laser Ablation Multicollector Inductively Coupled Plasma Mass S.
Hare. "New Calculations Show Proton-Boron Fusion Is Still Difficult—Fusion and Things."

(Continued)

*Primary Examiner* — Arun Goyal
*Assistant Examiner* — William L Breazeal
(74) *Attorney, Agent, or Firm* — Wyatt & Associates PLLC; Douglas C. Wyatt

(57) ABSTRACT

An ion fusion engine for spacecraft having a water vapor ion-based thruster, and a boron vapor injector which injects boron vapor into an exhaust region of the ion thruster causing proton-boron fusion to occur and thereby provide additional afterburner thrust. In addition, a plurality of pulsed lasers are utilized to focus on focal regions of the exhaust region to catalyze boron fusion events, and post exhaust sensors to provide feedback for control systems.

20 Claims, 11 Drawing Sheets

(56) References Cited

OTHER PUBLICATIONS

"Non-Local Thermodynamic Equilibrium (NLTE) Hydrogen-Boron Fusion | Frontiers Research Topic."
Scholz, Krol, Kulinska, Karpinski, Wojcik-Gargula, Fitta . . . "On the Possibility of Initiating the Proton-Boron Nuclear Fusion Reaction in the Plasma-Focus Device." Journal of F.
Osaka University."Balancing Beams: Multiple Laser Beamlets Show Better Electron and Ion Acceleration."
Tarditi et al. "NPL_Nasa".

* cited by examiner

FUSION THRUSTER

PRIORITY

This application claims priority to the U.S. Provisional Application Ser. No. 63/358,740, having a filing date of Jul. 6, 2022, the entire contents of which are all relied upon and fully incorporated herein by reference.

FIELD OF THE INVENTION

The field of the invention relates to the design and development of a rocket engine, and more specifically, the present invention relates to the design of an improved fusion thruster adapted for use with an ion thruster and a boron vapor injector used with laser-assisted fusion.

BACKGROUND OF THE INVENTION

Electric propulsion for spacecraft is highly desirable, and, through the years, many designs for electric engines for spacecraft have been proposed and implemented. Two important categories of electric spacecraft engines are ion engines and plasma engines.

Before the advent of electric spacecraft engines, chemical rockets were the only technology available for spacecraft propulsion, and the early decades of space exploration were based almost entirely on chemical rockets.

Most spacecraft propulsion systems accomplish their task by exploiting the momentum conservation principle. By that principle, if a mass is expelled by a spacecraft, there will be a force acting on the spacecraft while the mass is being expelled. Such force is referred to as "thrust" and is in proportion to the amount of mass expelled and the velocity at which the mass is expelled. The higher the rate at which mass is expelled, the higher the thrust. Similarly, the faster the velocity of expulsion of the mass, the higher the thrust.

From the principle of conservation of momentum, as described in the previous paragraph, it might seem that a high velocity of expulsion is desirable because it yields higher thrust with less mass being expelled. However, the higher velocity comes at the cost of higher energy. In particular, calculations show that the power that must be expended to achieve a certain amount of thrust increases in proportion to the velocity of expulsion.

In spacecraft design, reducing the amount of propellant that needs to be carried is highly desirable. Such a reduction can be achieved by increasing the velocity of the expulsion of the propellant. But reducing the amount of energy required by the spacecraft is also highly desirable, such that, in each space mission, a compromise must be struck between propellant mass and required energy. Such a compromise depends on the specific parameters of the mission and may be different in different parts of the mission. Therefore, it is advantageous to have a propulsion system wherein the propellant's expulsion velocity can be adjusted as needed to achieve such a compromise.

With chemical rockets, the propellant's expulsion velocity is limited by the amount of energy available from chemical reactions. Generally, the velocity of expulsion is much less than the optimum in most circumstances. That is why there is no benefit, with chemical rockets, in carrying propellant and the chemical fuel needed to provide the chemical energy.

Calculations show that the best results are obtained by using the spent chemical fuel as a propellant without mixing in the additional propellant. That is also why the mass of a space rocket sitting on the launch pad is so much larger than what eventually makes it into orbit. Most of that mass is fuel.

Electric spacecraft engines are advantageous because fuel and propellant are separate. In particular, energy is supplied to the engine as electricity, and the fuel from which the electricity is generated can come from, for example, a nuclear reactor or a radioisotope source. Both forms of fuel yield much more energy per unit mass than chemical fuels, so there is no need to use the spent fuel as a propellant. Better yet, for spacecraft close enough to the Sun, there is the option of generating electricity with solar panels. In such a case, the fuel is located in the Sun, and the spacecraft does not need to carry any fuel.

One potential benefit of electric engines is the opportunity to adjust the propellant's expulsion velocity. The feasibility of such an adjustment depends on the design of the electric engine, and some designs are better than others in that respect.

Electric propulsion can be divided into three categories: electrothermal, electrostatic, and electromagnetic. Electrothermal propulsion relies on heating a propellant gas stream to produce thrust, with little ionization of the gas (plasma formation). The operation of electrostatic and electromagnetic thrusters relies on the generation of a plasma stream, which is accelerated through electrified porous screens (grids, typically three) or a magnetic field (Hall effect).

Due to the highly energetic nature of plasma streams, these thrusters often require rare, exotic, and expensive materials to ensure a practical system lifetime. Electrical and thermal insulating materials, particularly ceramics, are necessary for fabricating components issues such as grid erosion (sputtering), chamber erosion, cathode life, overheating of external components, and electrical effects on the vehicle can be limiting factors for overall performance and working life. Energy supply and demands, component weight, and external hardware (such as gas fuel tanks) are our concerns for extended-life and extremely long-distance missions, such as long-dwell, high Delta-V cislunar missions.

As with many other technologies, the miniaturization of plasma thrusters with high impulse and efficiency is also needed. Much like chemical propulsion, electrical propulsion seeks more advanced concepts and designs that can reduce the size, mass, stress on components, and overall cost and eliminate the need for external auxiliary components, increasing performance (ISP and thrust) and using less power.

However, ion propulsion technologies have fallen short of many requirements, especially ISP and thrust.

Nontraditional nuclear propulsion technology utilizing fusion has yet to provide viable solutions. Containment of the fusion reaction is problematic. The standard fuel of deuterium and tritium-hydrogen, the "easiest" fusion reaction to achieve, requires temperatures of hundred million degrees Celsius. Indeed, earth-based experimental systems utilizing inertial confinement and magnetic confinement require extensive complex systems, such as tokamak and stellarators, which are housed in multi-building complexes, and require state-of-the-art superconducting magnetic coils to maintain intense magnetic confinement fields as well as sophisticated control processing to maintain a reaction for a brief moment in time.

Other fusion processes utilizing heavier elements such as boron and more challenging to achieve, requiring optimal temperatures of 1400M° C. to 4900M° C. See Hare (2020) ("New Calculations Show Proton-Boron Fusion Is Still Difficult—Fusion and Things." (fusionandthings.eu). Clearly, at these temperatures, p-B11, boron fusion is not a first choice for a solution.

Application of fusion technologies in the environment remains a far reach, such that ignition and containment of the fusion reaction within a space vehicle appear futile, and application of the result energies to a usable thrust vector appears nearly impossible.

There remains a long-felt need for an improved rocket engine design that addresses the aforesaid problems and provides a more efficient, practical, lighter, and more cost-effective design.

Accordingly, the instant invention intends to apply a "very difficult to achieve" fusion reaction as an afterburner in the ion thruster exhaust region to provide the unexpected result of additional thrust. See supra, Hare, at *1.

It is a further intention of the instant invention to provide an improved ion thruster having (1) increased performance; (2) lower cost; (3) be made from easily obtainable materials and fuels; (4) be small enough to fit in a CubeSat; ( ) and be scalable to propel larger spacecraft.

SUMMARY OF THE INVENTION

An improved ion-fusion engine is provided, which uses a vapor-based ion thruster, sometimes described as "a thrust head," which produces an ion exhaust through its exhaust port. The thruster uses a propellant, such as water, which turns into a vapor when exposed to a vacuum. The thruster is adapted to provide an exhaust plume comprising an electron flow and a proton and ion flow (preferably with constant "Q" or charge) at an exhaust region extending rearward from the thruster. The proposed in-space propulsion system uses a water vapor-based ion thruster known to make plasma rich in high-speed protons.

Laser-assisted proton-boron fusion is provided within the exhaust plume of the ion thruster to improve thrust by altering local electric fields, inducing localized acceleration.

Accordingly, a boron vapor injector is provided comprising a fuel reservoir, a vaporization chamber, a vaporizer, and a vapor delivery channel to deliver boron vapor to the exhaust region of the ion thruster or at least proximate to the exhaust port of the ion thruster.

When boron vapor is injected into the exhaust region—which comprises an accelerated high-energy ion stream—a fusion reaction occurs, providing additional thrust and further clearing the exit nozzle of any recombining particles while providing exit thrust. After ions have left the thruster and exhaust region, fusion will continue to occur outside the system, providing additional thrust not only to free the exit area of any interference but also to increase particle velocity, and hence the delta-v of the vehicle.

Furthermore, a plurality of pulsed lasers are disposed proximate to the ion exhaust port and adapted to direct a plurality of laser beams at the exhaust region where boron vapor has been injected. The pulsed lasers are modulated to create a superposition and constructive interference region where fusion is likely to incur in the reaction region. The plurality of pulsed lasers assists fusion ignition and/or further energizes the protons frame to assist fusion reaction. It is an insight of this invention that acceleration of particles using multiple small lasers would be helpful as only small hot regions of plasma are necessary for measurable fusion results.

Thus, high-energy protons and boron11 fuse to produce energetic alpha particles. Within an ion engine's exhaust plume, the energetic alpha particles disperse the exhaust plume via ambipolar diffusion, with positive alpha particles dragging electrons. Faster dispersal improves the space-charge density limit upon the ion flow rate and thrust.

It is to be understood that both the foregoing and the following descriptions are exemplary and explanatory only and are not restrictive of the invention, as claimed. Specific examples are included in the following description for clarity, but various details can be changed within the scope of the present invention.

BRIEF DESCRIPTION OF THE DRAWINGS

A preferred embodiment of the invention has been chosen for detailed description to enable those having ordinary skill in the art to which the invention pertains to understand how to construct and use the invention readily and is shown in the accompanying drawings in which:

FIG. 4F shows a simulated relationship between momentum and time for a +/−1000V thruster.

The above-referenced figures are not to scale and are for reference only to assist the reader in understanding the invention in conjunction with the detailed written description which follows.

DETAILED DESCRIPTION OF THE INVENTION

Figure 1:
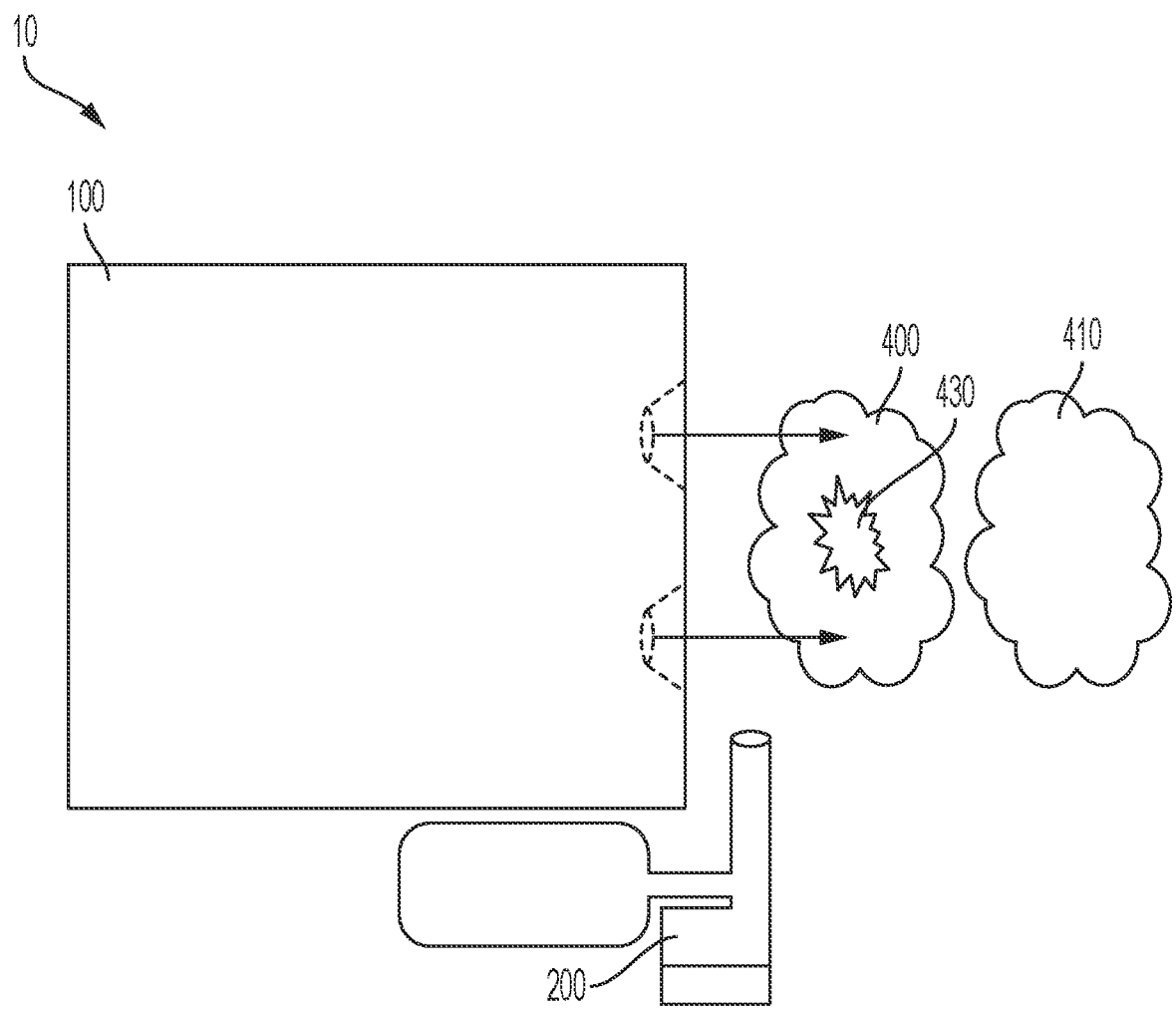
FIG. 1 is a conceptual diagram of a top view of an embodiment of an improved ion fusion thruster according to the invention.

FIG. 1 is a conceptual diagram, not to scale, that illustrates an embodiment of an improved ion fusion thruster 10 according to the invention comprising an ion thruster 100, and fuel injector 200, wherein an exhaust region 400 is created for fusion events.

It can be appreciated by persons of ordinary skill in the art that the fusion engine described herein can be adapted for use in a spacecraft having power and control systems to be integrated with the fusion engine subsystem and other subsystems. Accordingly, conciseness and brevity connections to these power and control systems are omitted as it is well known by persons of ordinary skill in the art that connections to power and control systems are utilized for spacecraft subsystems.

Figure 2:
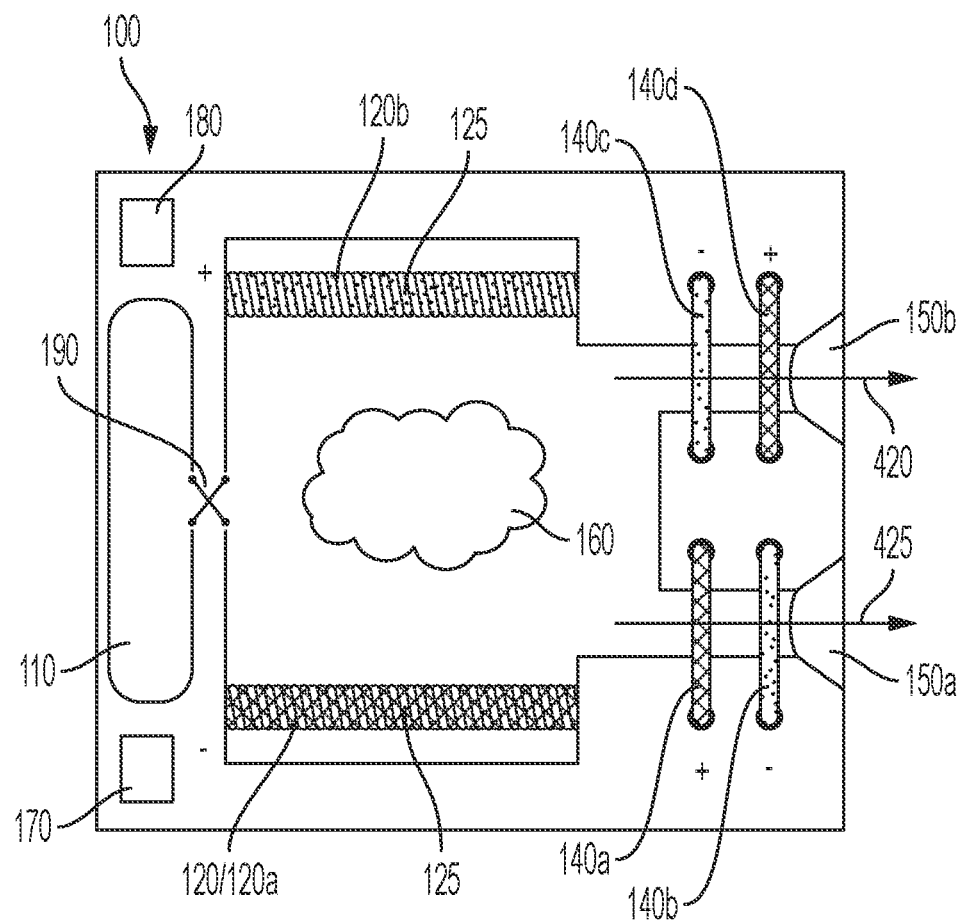
FIG. 2 is a conceptual diagram of an embodiment of an ion thruster according to the invention from a cutaway top view.
Figure 3:
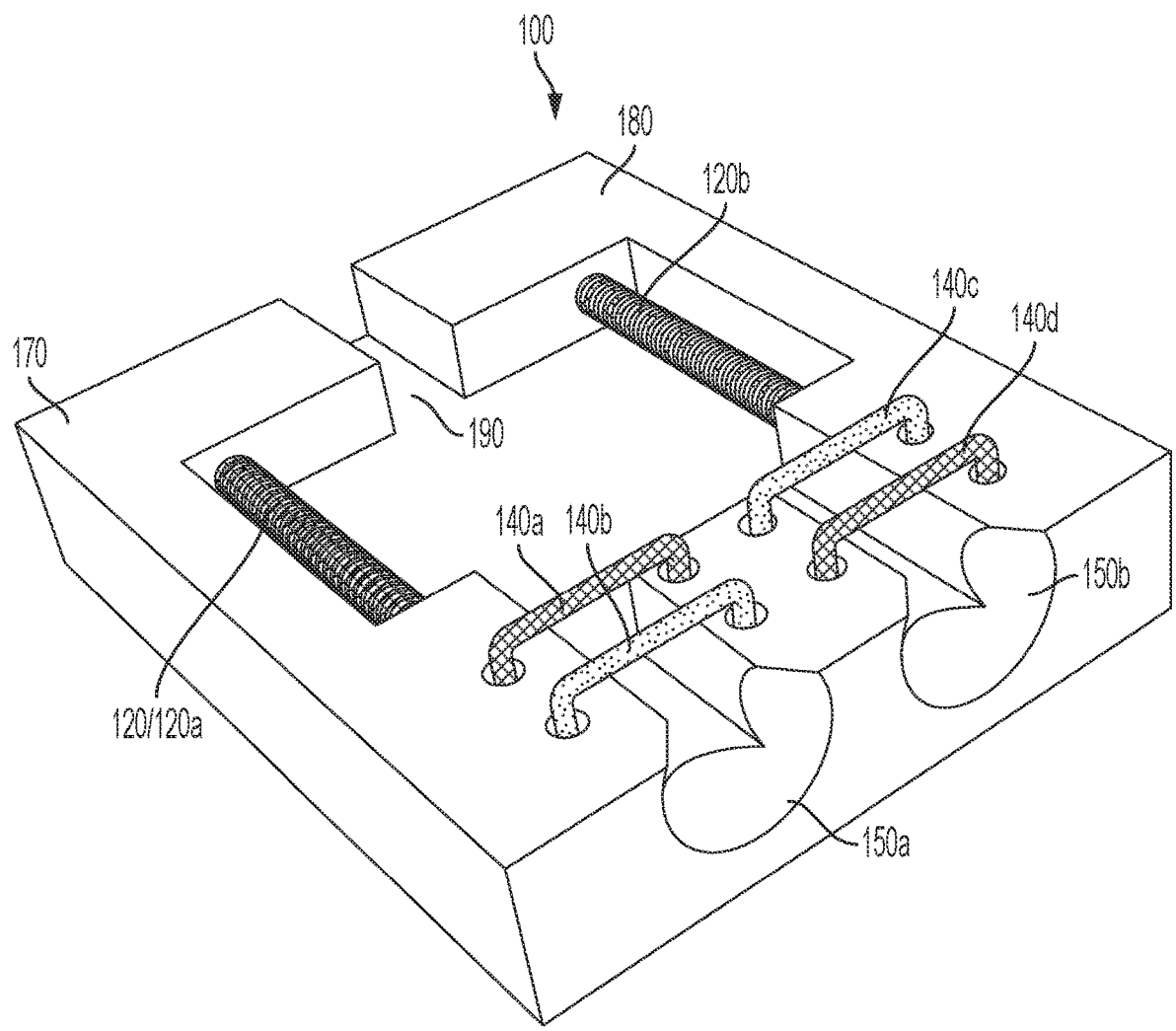
FIG. 3 is a conceptual diagram of an embodiment of an ion fusion thruster according to the invention from the perspective view.

Specifically, in FIG. 2 and FIG. 3, cutaway views of conceptual diagrams of a preferred embodiment of an ion thruster 100 according to the invention are shown, not to scale. The ion plasma thruster 100, or thrust head, comprises a plasma generator 120, contained within a thrust head vessel 170 for containing a plasma chamber 160 wherein a plasma is produced. It known by persons of ordinary skill in the art to provide propellant containment, and basic flow management. Accordingly, a propellant container 110 can be provided external to the thruster 100 or provided integral with the ion thruster 100 (as shown in FIG. 2). The thrust head vessel 170 includes at least two apertures or exhaust ports 150 at a rear of the thruster. The figures show the interior of the device, and it should be obvious that the vessel encloses the plasma chamber. Preferably, the vessel 170 includes a first exhaust port 150a and second exhaust port 150b at a rear end of the thruster 100.

A water vapor-based ion thruster 100, according to the invention, is adapted to suit conditions of a vacuum or space environment. An ion thruster 100, according to the invention, can be a modified variant of an ion thruster described in U.S. Pat. No. 9,856,862 by Faler et al. entitled "hybrid electric propulsion spacecraft," but without the internal laser and other particular details of the instant invention described herein (laser "130" of Faler 2014) among other differences as can be appreciated by a person of ordinary skill in the art. The teachings and contents of Faler et al. are incorporated herein by reference. It can be appreciated by a person of ordinary skill in the art that variations of an ion thruster 100 according to the invention can be adapted from other known ion thrusters in accordance with the teachings of the instant invention.

The propellant container 110 is adapted for containing an ionizable propellant 185, such as water, heavy water (Deuterium-based water), and/or hydrogen peroxide, among other things, and has an aperture disposed at the front end of the thruster 100 to introduce the propellant into the plasma chamber 160. A propellant container 110 can be integral or separate from the thruster 100. A valve 190 can be provided, separating the propellant container and the plasma chamber 160. In a preferred embodiment, where water is chosen as propellant and valve 190, water (liquid, solid, vapor) is in a propellant container that can be substantially like a Knudsen cell. This creates a plenum of vapor at the water vapor pressure. The valve regulates the passage of vapor from this plenum. As described, liquid water is gated in the valve, which would cause rapid boiling and freezing of the water where liquid water meets vacuum conditions. Preferably, the vapor is delivered to the thruster to create a plasma, not liquid.

In addition, the ion thruster 100 includes a plasma generator 120 and is provided to create a plasma of the vaporized propellant in the plasma chamber 160. Plasma generators are well-known in the art and include power sources and power modulators 130 for plasma generators.

In the embodiment shown in FIG. 2 and FIG. 3, a positive plasma generator electrode 120b and negative plasma generator electrode 120a are provided. Ion engines are well known by individuals of ordinary skill in the art to include an electrical power source (not shown) for such an electric engine to create a spark across the potential of the positive and negative plasma generator electrodes, thereby dissociating electrons from the vaporized propellant to create a plasma of positive ions and negative electrons within the plasma chamber 160.

It can be appreciated by those of ordinary skill in the art that other variations of plasma generators are well within the scope of the disclosed invention. For example, such a plasma generator 120 may comprise a spark generator for generating an electric spark across the face of a solid surface. The heat of the spark causes some of the solid material to vaporize, and then the mobile electrons of the spark ionize the particles of the vaporized material. Such ionization results in the vaporized material becoming a plasma of free electrons and free positive ions. For example, the solid material might be made of carbon, in which case the positive ions are carbon atoms that have lost one electron. The mass of one such positive ion is, as is well known in the art, approximately 22,000 times as much as the mass of one electron, but the positive ion has an electric charge that is the same as the charge of one electron, with the opposite sign.

In one embodiment of the invention shown in FIG. 2, the plasma generator 120 is adapted to intermittent plasma, and not a continuous production of plasma from propellant introduced into the plasma chamber 160. Plasma generation must be intermittent. In this embodiment shown in FIG. 2, it can be appreciated that plasma generation may naturally be intermittent because the spark that is produced causes a shockwave that sweeps gas away from the electrodes, ceasing the spark and plasma generation.

A propellant vaporization modulator 180, electrically connected to the plasma generator 120, can be provided to modulate or throttle the generation of plasma. Alternatively, a separate plasma power modulator 130 can be provided for pulsed or periodic production of plasma. For example, the plasma generator 120 is preferably activated for a short period of time to generate plasma in bursts and not continuously. Therefore, the propellant vaporization modulator 180 can also be electromechanically connected to valve 190 for controlling the flow of propellant into the plasma chamber 160 during the charging of a plasma generator 120 for intermittent plasma generation. It can be appreciated by a person of ordinary skill in the art that the propellant modulator 180 can be a programmable integrated circuit or ASIC (application-specific integrated circuit) or even a simple switch to coordinate intermittent plasma generation.

The thrust head vessel 170 is a vessel for confining the plasma generated by the plasma generator 120 to a finite volume of space. It is well-known in the art how to make such a containment vessel. For example, a plasma containment vessel might be made of acrylic material. In the illustrative embodiment of the present invention represented in FIG. 1, plasma containment vessel 110 is made of such material. It will be clear to those skilled in the art, after reading this disclosure, how to make and use plasma containment vessels made of other materials. Other acceptable materials include other plastics and ceramics, given their insulating nature preserves the electric field shape needed for the operating cycle.

Furthermore, as shown in FIG. 2 and FIG. 3, an embodiment of the ion thruster 100, according to the invention, includes exhaust electrodes 140a, 140b, 140c, and 140d. The exhaust electrodes are electrical conduits that provide electro-motive force and an electrical potential barrier for the controlled release of energized plasma.

The exhaust electrodes are preferably embedded in the wall of the plasma containment vessel 110 to avoid shorting or arcing across ionized plasma when energized. They are placed in the vicinity of openings 150a and 150b for the purpose of generating electric fields in and around the openings.

The exhaust electrodes 140a, 140b, 140c, 140d are connected to a further power source (not shown) and constant charge generator 145 that includes the necessary capacitors and diodes to provide constant charge for the (voltage) potential across the openings 150. Powering of such electrodes in ion engines is well-known in the art. In particular, exhaust electrodes 140a and 140d are provided with a positive side connection of a constant charge generator 145, and exhaust electrodes 140b and 140c are provided with a negative side connection of a constant charge generator 145. Such connections are indicated in the figure by "plus" or "Minus" symbols, i.e., "+" and "−" respectively.

The constant charge generator 145 is not shown as it is well-known in the art how to make a charge generator. For example, such a generator might be a direct-current (DC) power supply that generates a suitable voltage ("acceleration voltage") electrically connected to one or more capacitors and/or diodes to provide constant negative or positive charge to the exhaust electrodes 140. Accordingly, the ion thruster 100 can be described as a "constant Q" ion thruster.

It is an important aspect of the improvement of the invention to provide constant charge as opposed to constant voltage since voltage across electrodes 120 may vary as charged particles cycle through the device, as described further below. As already mentioned, it is a feature of the present invention that, nominally, no substantial current flows through electrodes, such that the generator does not have to provide any substantial power, just an acceleration voltage, and recharging capacitors when necessary to provide constant charge. In practice, the acrylic material is not a perfect insulator, and some small leakage current will likely be present. Therefore, the DC power supply needs to be kept turned on during regular operation in order to keep the electrodes continually polarized; however, the amount of energy that the DC power supply must deliver is very small, just enough to counteract the leakage current.

The voltage applied to electrodes 140a, 140b, 140c, and 140d results in the creation of electric fields in the volume of space inside exhaust ports 150a and 150b. Such electric fields are a barrier to the flow of plasma particles, such that the plasma, as generated by the plasma generator, remains inside the containment vessel until ions achieve a predetermined threshold energy. This is so because the plasma generator is provided with only enough energy to ionize the plasma.

It can be appreciated that cold plasma, i.e., a gas that has been ionized but not further heated, has portions of its population with sufficient kinetic energy to overcome the barriers. Higher-energy electrons overcome the barrier in one exit channel, and higher-energy ions use the other channel. This separates the plasma into hot and cold portions, trapping the cold portion within the reaction chamber.

Further, as electrons are less massive, they accelerate to higher speeds than the ions and leave first. This creates further separation in the plume, creating the electron-rich first exhaust wave (the virtual cathode), then a second ion-rich exhaust wave (a virtual anode).

In an embodiment of the thruster 100 shown in FIG. 2 and FIG. 3, a first exhaust port 150a is disposed proximate to the negative plasma generator 120a, and the second exhaust port 150b is disposed proximate to the positive plasma generator 120b. Each exhaust port 150a/150b is provided with an appropriate electric field to permit energized plasma to exit the rear of the thrust head 100, thereby providing initial thrust to the engine 10. For example, a second exhaust port 150b is provided with a "negative flow" electric field to promote primarily high energy negatively charged particles to pass, and a first exhaust port 150a is provided with a "positive flow" electric field to promote primarily high energy positively charged particles to pass.

As can be seen in FIG. 2, one embodiment of the invention provides for exhaust electrode 140a, closest to the plasma chamber having a positive charge, and exhaust electrode 140b is provided further from the plasma chamber and closer to the first exhaust port 150a having a negative charge. Thus, a positively charged particle flow 425 is provided.

Similarly, as shown in FIG. 2, one embodiment of the invention provides for exhaust electrode 140c, closest to the plasma chamber having a negative charge, and exhaust electrode 140d, further from the plasma chamber and closer to the second exhaust port 150b having a positive charge. Thus, a negatively charged particle flow 420 is provided.

The arrangement of positive plasma generator electrode 120b proximate to the negative flow electrodes 140c and 140d associated with the second exhaust port 150b promotes the flow of negatively charged particles, namely electrons, and the arrangement of negative plasma generator electrode 120a proximate to the positive flow electrodes 140a, 140b associated with the first exhaust port 150a promotes the flow of positively charged particles, namely positive ions, and protons.

As plasma is formed within chamber 160, the hottest high energy electrons of the plasma are first to overcome the voltage barrier of the electrodes 120, primarily overcoming the potential at second exhaust port 150b and exiting rearward of the spacecraft to form a virtual cathode 410 at a distance from the ion thruster 100. As hot, negatively charged particles leave the chamber, the remaining trapped, colder elements of the plasma are left behind, creating a charge imbalance. The net positive charge of the plasma and, thus, the ion fusion thruster 10 provides an attraction of the accelerating negative charges to form the virtual cathode 410. In addition, some hot, negatively charged particles may leave the chamber through the first exhaust port 150a and can create an interference pattern with electrons leaving the second port 150b. It can be appreciated by a person of ordinary skill in the art that characteristic of the two exhaust electrodes on the one hand, focusing and accelerating electrons escaping the device and on the other hand, trapping and rejecting cold ions can be described by the Maxwellian distribution.

As plasma is depleted of electrons and a virtual cathode or negative charge region 410 is formed at a distance from the rear of the exhaust ports 150, the positively charged ions remain in the plasma chamber 160 and acquire sufficient energy to overcome the barriers across electrodes 140, and primarily exiting through first exhaust port 150a. The positively charged ions are further accelerated by the negative charge region 410 of the virtual cathode.

Furthermore, multiple ion species and neutral collisions in the plasma chamber 160 cause a Wakefield effect, accelerating protons to high energy, suitable for fusion. In this context, Wakefield effect generally relates to accelerating leading edge particles by repelling them from trailing edge particles. Once positive ions (including protons) overcome the barrier presented by the electric fields, they will start flowing through the exhaust ports. As positive ions leave the positively charged chamber 160 and thruster 100, the repulsive force of the like charges further accelerates the positive ions, which are also attracted by the attractive force of the negative charge region 410.

As shown in FIGS. 1 and 2, exhaust port 150b opens into a vacuum, such as space, so the electrons that escape through the outlet leave the spacecraft entirely while leaving behind the uncombined positive ions. As more and more electrons leave the spacecraft, the spacecraft acquires a positive charge because of the positive ions left behind, and the negative electrons are attracted back toward the spacecraft.

As more and more electrons accumulate outside the spacecraft, in the volume of space just outside the exhaust port 150b, they form a negatively-charged cloud referred to as a space charge or virtual cathode 422.

The negative space charge on the outside of the containment vessel and in front of the outlets and the cloud of positively charged ions in the containment vessel alters the shape of the electric field in outlet 150b. The attraction of the positive ions by the negative space charge pushes the ions in the direction of the outlet with enough kinetic energy to overcome the barrier in that outlet.

Much like the polarity of the electric fields in exhaust port 150b favored the flow of electrons, the polarity of the electric fields in outlet 150a favors the flow of positive ions, such that when the space charge has accumulated enough electrons, positive ions, and protons start flowing through exhaust port 150a while being accelerated by the electric fields in the exhaust port. In FIG. 2, the paths of predominantly positive charge particles 425 and paths of predominantly negative charge particles 420 are shown.

Like exhaust port 150b, exhaust port 150a also opens into the vacuum of space in the same direction as exhaust port 150b. Therefore, the positive ions and protons that are accelerated by the electric fields in exhaust port 150a escape into the same volume of outer space where the space charge is present.

The electron space charge in this illustrative embodiment of the present invention behaves similarly to the cathode of an ion engine and is referred to as a "virtual cathode" 410 depicted in FIG. 1.

Figure 4B:
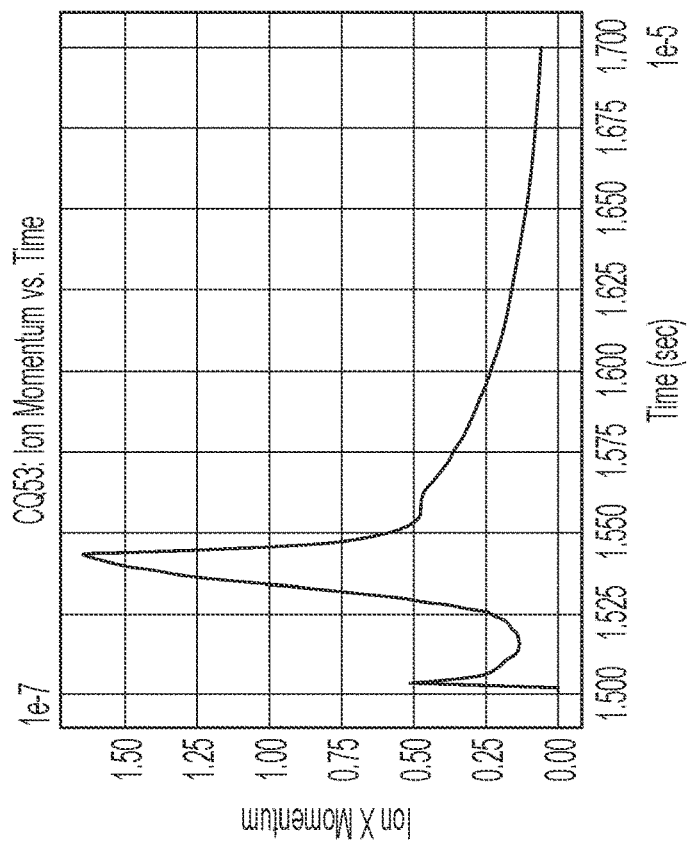
FIG. 4B shows a simulated relationship between momentum and time for a +/−250V thruster.
Figure 4A:
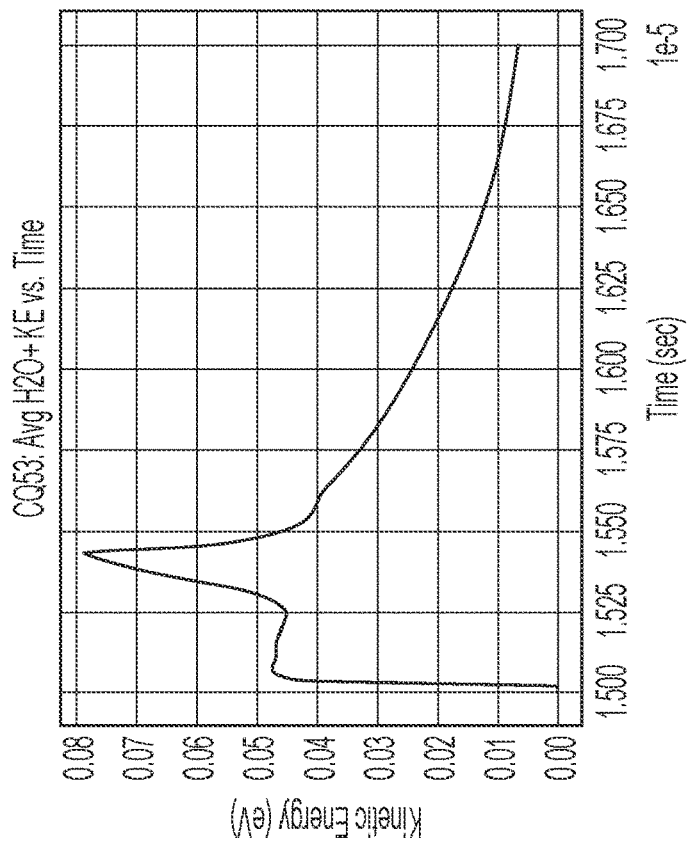
FIG. 4A shows a simulated relationship between kinetic energy and time for a +/−250V thruster.
Figure 4D:
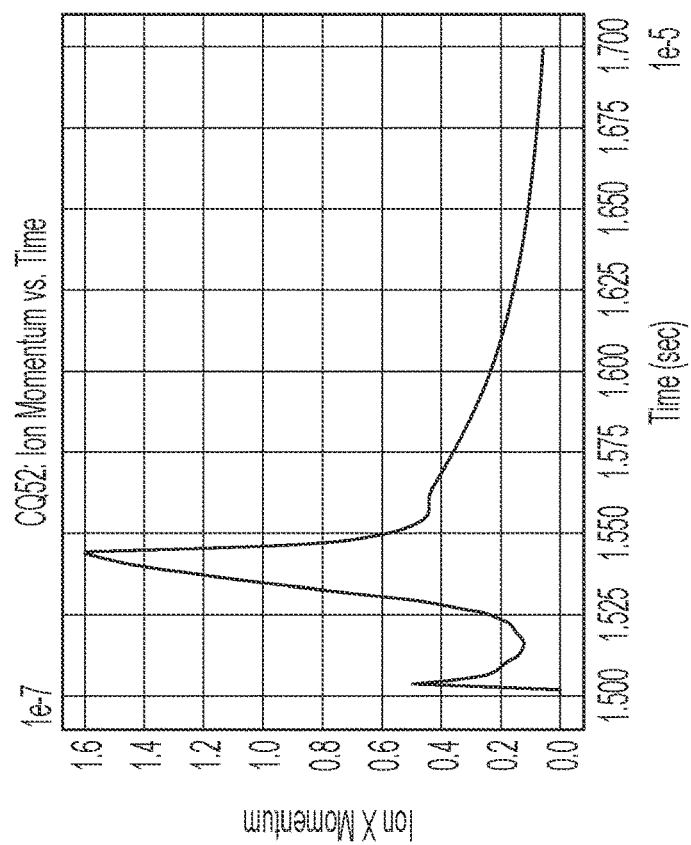
FIG. 4D shows a simulated relationship between momentum and time for a +/−500V thruster.
Figure 4C:
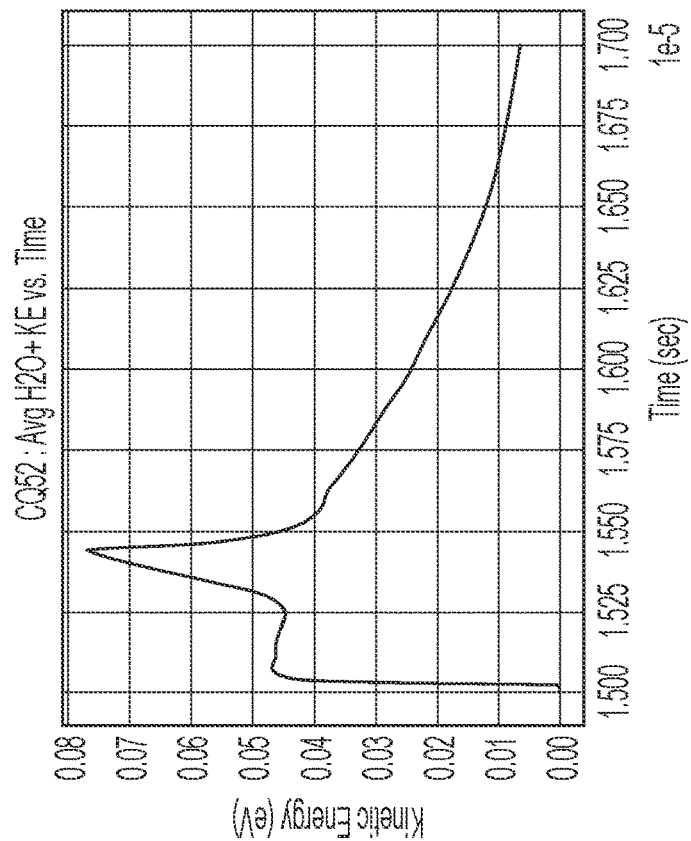
FIG. 4C shows a simulated relationship between kinetic energy and time for a +/−500V thruster.
Figure 4F:
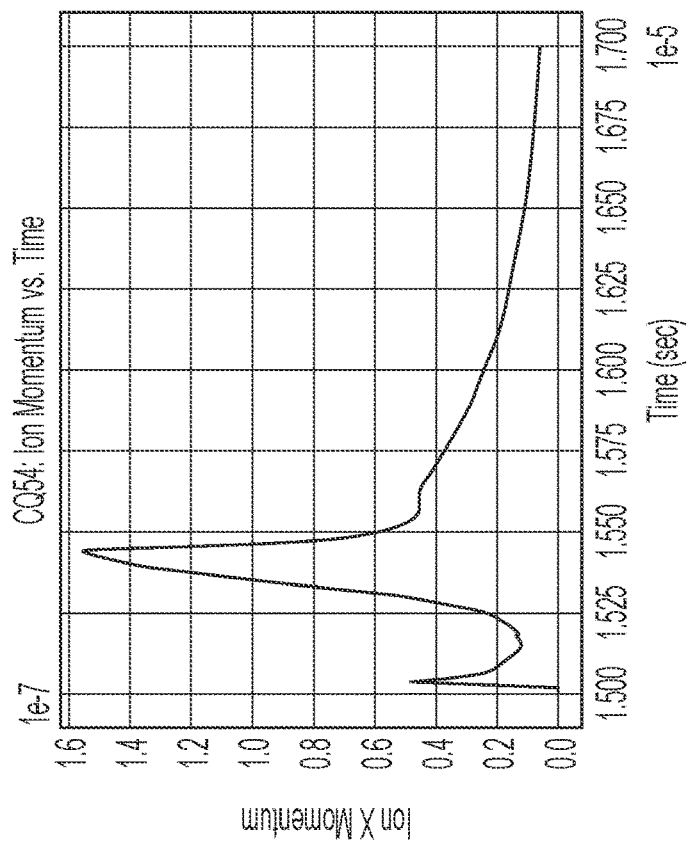
FIG. 4F shows a simulated relationship between kinetic energy and time for a +/−1000V thruster.
Figure 4E:
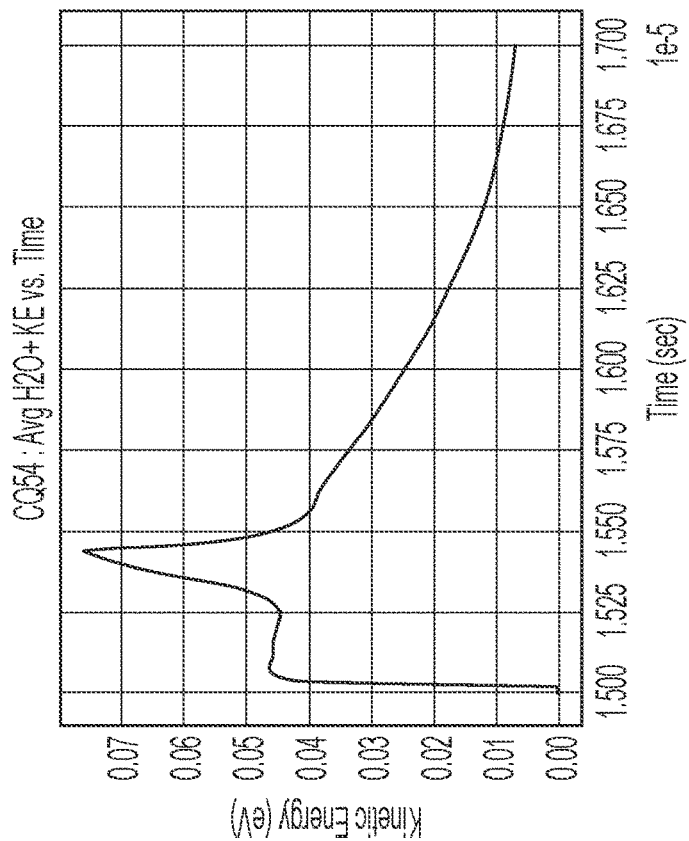

FIGS. 4a, 4B, 4C, 4D, 4E, and 4F are provided to illustrate two simulated relationships between plasma formation and voltage across the electrodes 140. FIGS. 4A and 4B represent a momentum step process simulation and pressure-based thruster simulation output for +/−250 V, respectively, where FIG. 4A shows kinetic energy over time, and FIG. 4B shows momentum over time. FIGS. 4C and 4D likewise show the two simulations for +/−500V. FIGS. 4C and 4D likewise show the two simulations for +/−1000V.

By varying voltage applied to the spark and acceleration electrodes, an understanding of the impact on thrust can be appreciated. It can be appreciated by a person of ordinary skill in the art that the ability to form a spark with a given voltage is a function of gas feed pressure and spark electrode surface geometry. In a preferred embodiment, the structure of the plasma generator electrodes 120a, 120b are formed as cylindrical rods, which include concentric grooves 125 or alternatively helical grooves such as shown in FIG. 2. In a further embodiment of the invention, the symmetrical rods of the generator electrodes 120a, and 120b can be provided as longitudinal channels 127. The geometries of the electrodes 120 promote the channeling of positive and negative particles created in the plasma towards separate exhaust ports 150.

A preferred embodiment, voltage across electrodes 120 can be varied from +/−250V to +/−1000V. It is understood that the thrust vector may change with voltage, deviating more as voltage is increased. Fast ions typically first leave the reaction chamber via the second port 150b, which is polarized to prefer electrons. Raising voltage may not only accelerate ions more, but also increases the energy barrier to fast ions exiting via the electron pathway. Thus faster ions leave the chamber, increasing the imbalance and causing a thrust vector to occur.

Ionization shows a trend of decreasing with increasing voltage, as may occur due to lower residency time of faster ions causing fewer interactions. In periods of intense ionization, new, slow particles are being generated while old, fast particles are leaving. The net effect is an increase in particle count and a "break" effect. As the voltage increases, the ion speed increases, and so does the rate of ion formation. The two thrust measurements show opposing trends. The momentum-step process shows a decline with increasing voltage. The pressure thrust shows growth with growing voltage, particularly in the lateral thrust that gives rise to a thrust vector. One aspect of the pressure-thrust estimation is based upon impacts within the walls of the thruster of ions that never leave the region. It is understood that cold ions that are rejected by the voltage barrier impact the front wall of the plasma chamber 160 and impart additional momentum.

It can be seen in FIGS. 4A-4F, that as voltage rises, the energy of an average ion decreases. As the voltage rises, the total momentum (and thus energy) of all ions rise. Higher voltage traps more ions in the reaction chamber, preventing all but the fastest from leaving through the pathway that is polarized, and thus prefer electrons. Trapped ions have low energy as they bounce between walls and are decelerated by the plume's ions during rebounds. Positive ions and protons increase velocity by being repelled by an increased number of trapped ions while simultaneously having reduced repulsion from the other plume ions due to decreased exit rate.

Figure 5A:
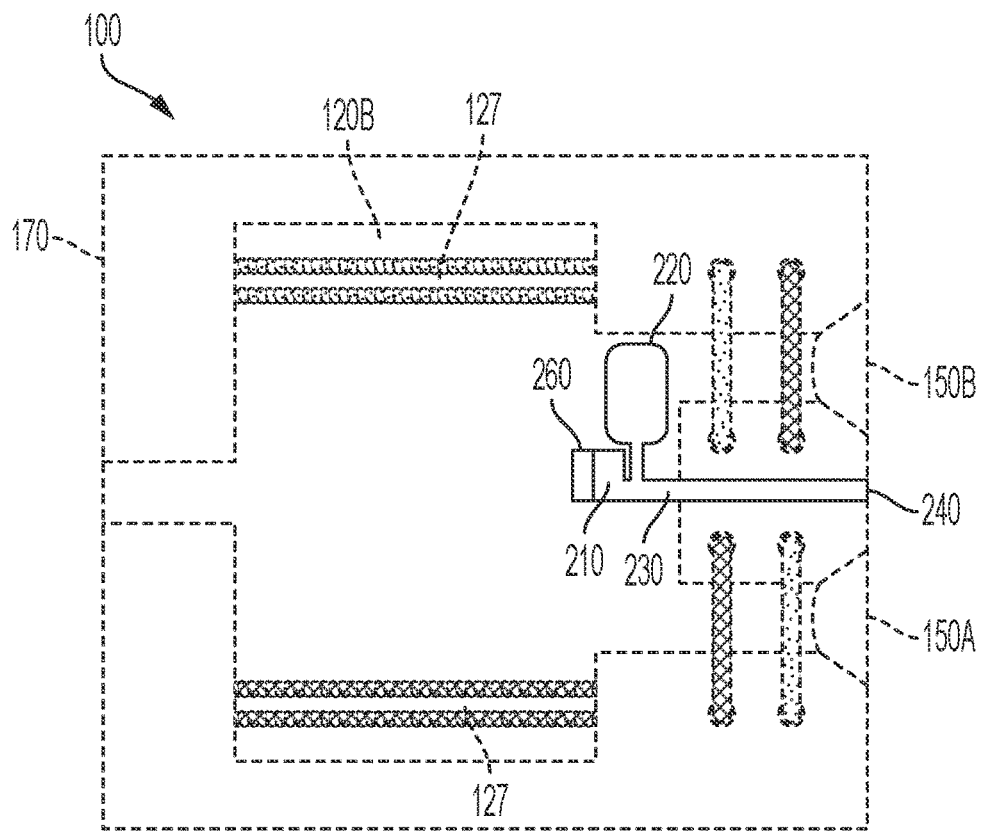
FIG. 5A is a conceptual diagram, from a top view, of an embodiment of an improved ion fusion thruster wherein the boron injector is shown overlaying a top side of the ion thruster and not within.
Figure 5B:
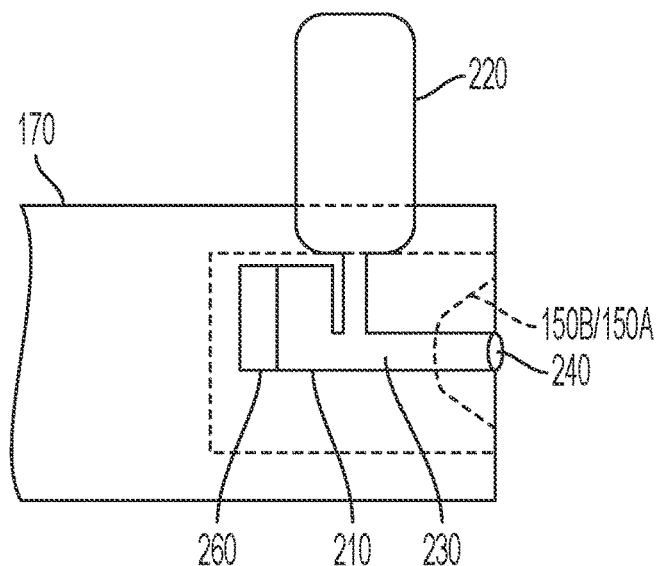
FIG. 5B is a conceptual diagram, from a side view, of an embodiment of an improved ion fusion thruster wherein the boron injector is shown overlaying a top side of the ion thruster and disposed between two exhaust ports.

FIGS. 5a and 5b are conceptual diagrams illustrating aspects of an embodiment of a fuel injector 200 shown in FIG. 1. In the embodiment shown in FIG. 1, fuel injector 200 can be a boron vapor injector 200. The fuel injector is disposed at a side of the ion thruster 100 where the fuel injector 200 injects fuel, such as boron vapor, orthogonal to the direction of exhaust into the exhaust region 400. In an alternative embodiment shown in FIG. 5a, the fuel injector 200 injects fuel or boron vapor in-line or axially with the direction of exhaust into the exhaust region 400. A benefit of injecting boron vapor axially between the exhaust ports is that the injected paper is provided in a low-density area before the exhaust region 400 and between the two exhaust ports. In this manner, the vapor does not clog the exhaust ports. FIG. 5a shows a top view of an embodiment of the ion thruster 100 with the fuel injector 200 at a top side of the thrust head vessel 170 of the ion thruster 100 having a vapor exhaust port 240 integral and disposed between the two exhaust ports 150. FIG. 5B shows a side view of an alternative embodiment where the boron injector 200 is disposed at a side of the thrust head vessel 170 and injects vapor at a distance from the exhaust ports. It can be appreciated by a person of ordinary skill in the art that a fuel injector 200, according to the invention, can be located in many variations and configurations, provided that the exhaust port 240 is proximate to at least one of the exhaust ports, and is adapted to direct the vaporized fuel toward the exhaust region 400 and/or reaction region 430 where fusion reaction is intended.

In a further embodiment, a fuel injector 200, according to the invention, comprises a vaporizer 210, a fuel reservoir 220, a vaporization chamber 230, and a vapor exhaust port 240. A preferred embodiment, the fuel reservoir, is adapted to contain an afterburner fuel 250, such as boron 10, or boron 11, which can be provided in a water solution, such as a chemical analysis reference solution. The aqueous solution and standardized density give better control over the vaporization process. The fuel or boron solution 250 is fed to a vapor delivery channel leading to a vaporization chamber 230 proximate to a vaporizer 210, which vaporizes the fuel in the vaporization chamber 230. It can be appreciated by a person of ordinary skill in the art that the improved ion fusion engine 10, according to the invention, can be adapted with other fuel 250 types, including lithium, lithium 6, lithium 7, and helium. For example, using "heavy water" (D2O) as a propellant 185 and injecting Helium gas as fuel 250 into the plume could enable D-He fusion. Relative to proton-Boron 11 fusion, Deuterium-He fusion takes half the energy and has a 10× greater cross-section. D-He needs 58 keV energy to start, and pB11 needs 123 keV. D-He is aneutronic like pB11. In addition, or in the alternative, injecting lithium as a fuel into the plume enables proton lithium fusion. Proton-lithium fusion needs 66 keV to start but is half the cross-section. Furthermore, proton-lithium fusion is aneutronic and may be preferable in some instances.

In a preferred embodiment, the vaporizer 210 comprises a laser diode. However, it can be appreciated by a person of ordinary skill in the art that other vaporizers can be used, such as electrical heaters or the use of the vacuum itself. Once the boron fuel 250 is vaporized, the vaporized boron atoms are injected into the exhaust region 400 of the thruster 100 for fusion reaction via a vapor exhaust port 240, thereby doping the plasma as they exit the vaporizer in an ion-rich exhaust region.

In a preferred embodiment, the distance between the vaporizer and vapor exhaust port 240 and exhaust region 400 should be made as short as possible for more accurate modulation of vaporization. In one embodiment, the distance between the exhaust port 240 and exhaust region 400 is approximately 8-10 cm, and it can be appreciated by a person of ordinary skill in the art that configuration of the exhaust port 240 and the fuel injector should be designed to accommodate this parameter.

A vaporization modulator 260 is provided and electrically connected to the vaporizer for modulating or changing the vaporization rate and injection of the vapor into the exhaust region for fusion events. The vaporization modulator 260 can be a programmable integrated circuit or ASIC or a simple timed switch in coordination with the propellant 180 and plasma modulator 130. Preferably, the modulator provides a pulsed injection of boron at a frequency of approximately 400 to 600 Hz to provide pulsed detonation but can also receive signals from a feedback sensor to modify the pulse frequency. In a further embodiment of the vaporization modulator 260, the modulator 260 is adapted to provide a non-resonant periodicity. A further embodiment of the modulator 260 provides a pulsed injection of fuel according to a Fibonacci sequence. It is understood through experimental results that resonance of the vaporization modulator 260 and plasma cycle generator 120 can create interference patterns in the reaction cycle where electrons initially form the virtual cathode and are followed by a pressure wave of positive ions. Accordingly, fuel injection rate can be chosen from a periodic injection, non-harmonic periodic injection, and Fibonacci rate periodic injection by the modulator 260.

Figure 6:
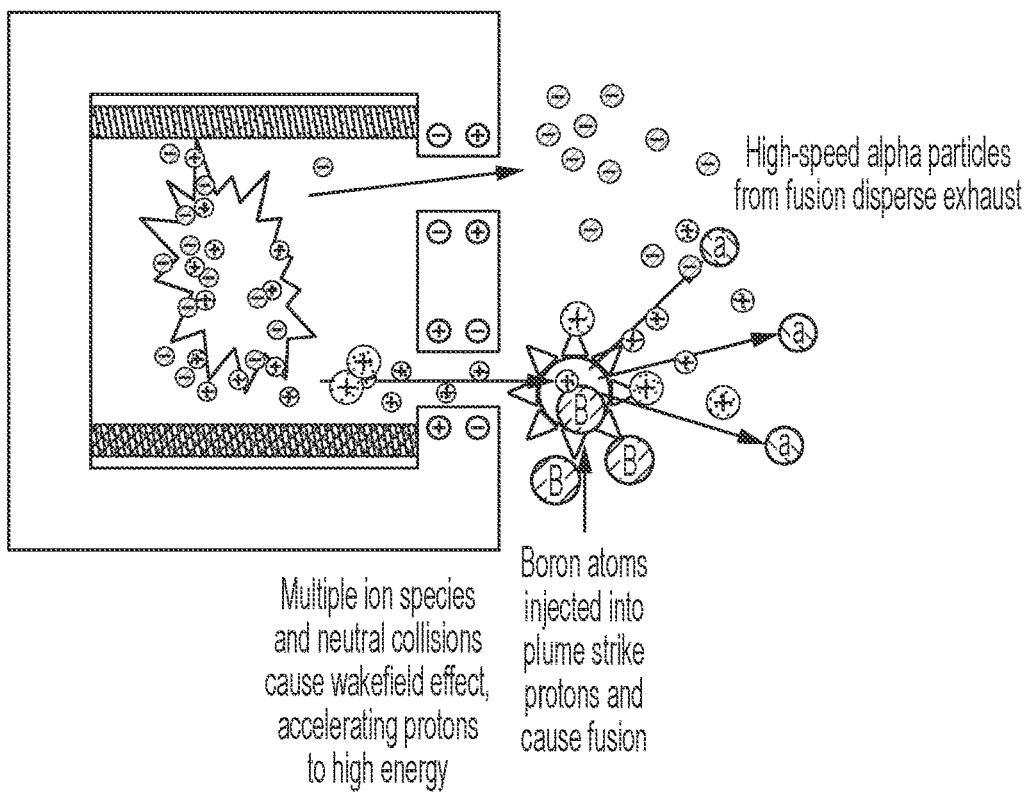
FIG. 6 is a conceptual diagram of an embodiment of the improved fusion thruster in use with plasma and resultant charged particle streams.
Figure 7:
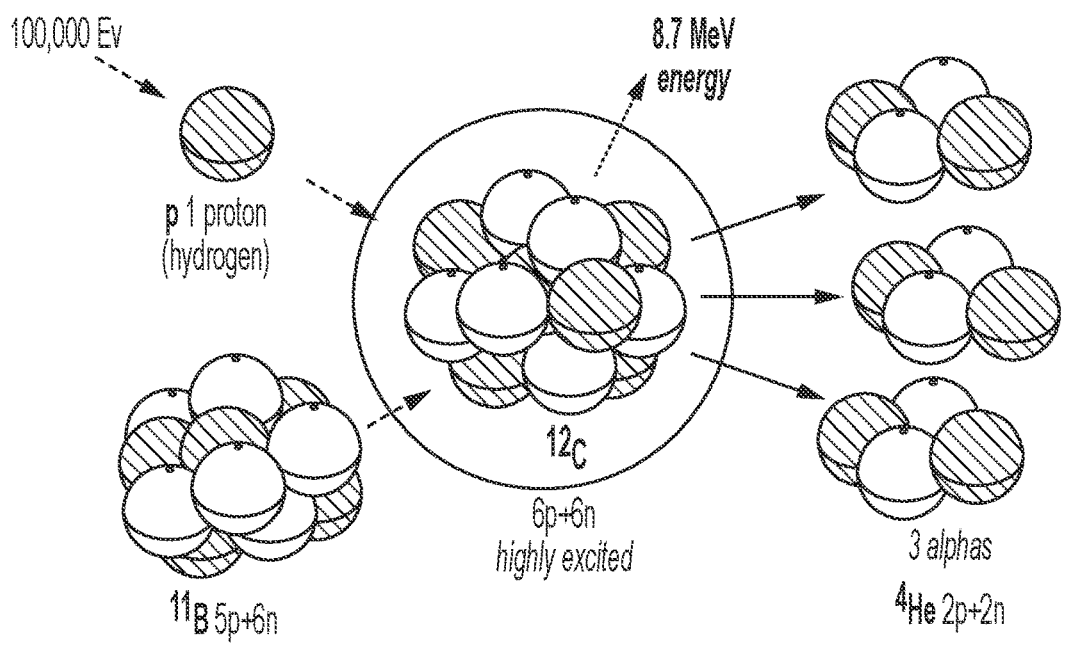
FIG. 7 is a conceptual diagram of a proton-boron fusion reaction.

FIG. 6 and FIG. 7 illustrate conceptual aspects of the fusion events when an embodiment of the fusion engine is in operation. Specifically, FIG. 6 shows the activation of the plasma and production of ions which produce separate ion streams to produce an exhaust region, whereafter boron is injected for fusion events. FIG. 7 shows a conceptual diagram of a proton-boron 11 fusion event with resultant energies.

Figure 8:
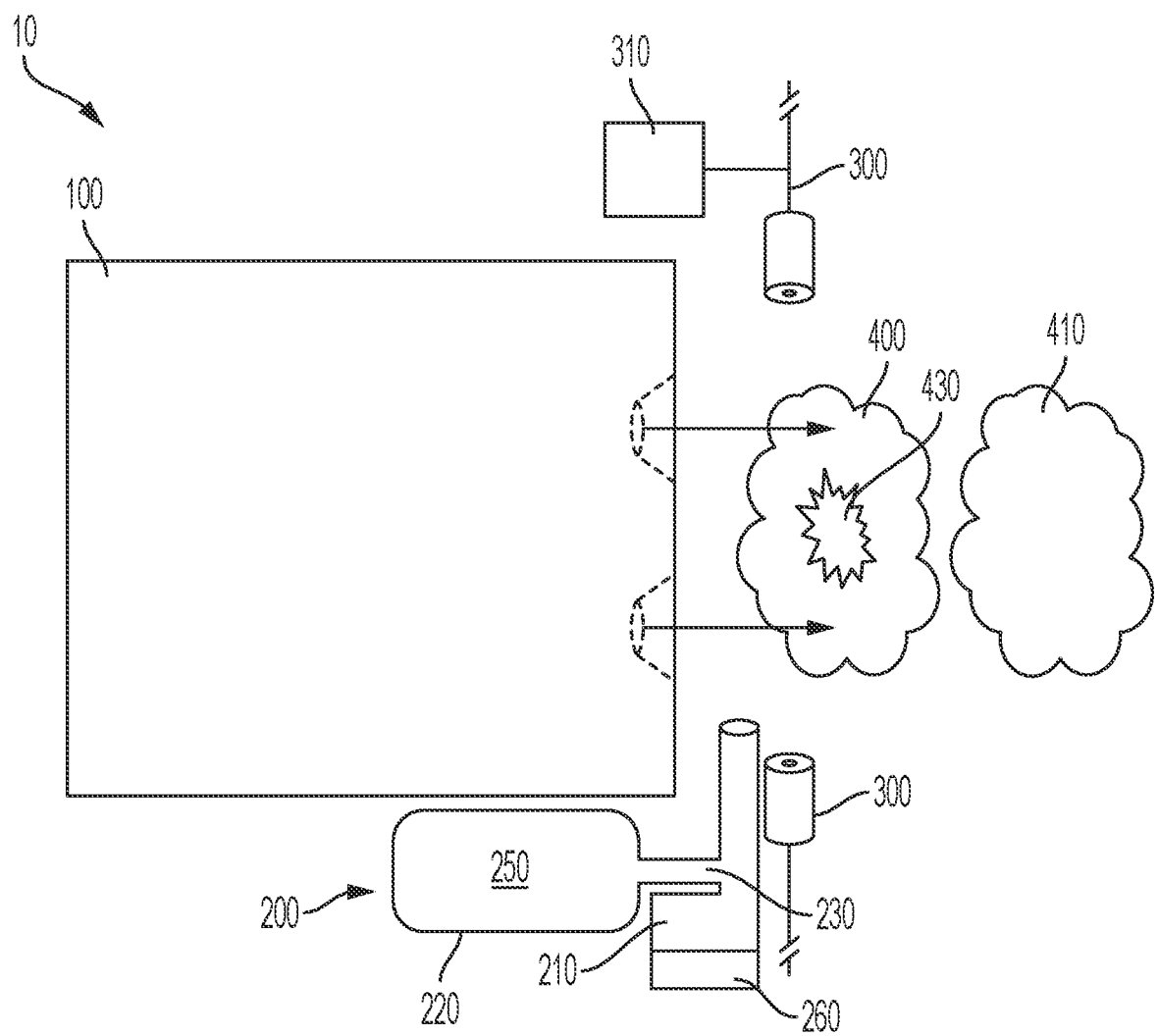
FIG. 8 is a conceptual diagram of a top view of an embodiment of an improved ion fusion thruster according to the invention, including a laser array.

As shown in FIG. 8, an alternative embodiment of the ion fusion thruster, according to the invention, is shown, including a laser array 300, comprising a plurality of pulsed lasers controlled by a laser modulator 310. The laser array 300 comprises a plurality of powerful laser diodes, which are preferably disposed around the rear area of the thruster proximate to the exhaust region and oriented in a matter where the plurality of lasers, when activated, focus their waveforms on a predetermined common point within the exhaust region. Laser pulses from several directions and wavelengths are focused onto the region rich in vaporized fuel 250, such as protons and boron11, driving plasma particle energies to fusion-level in the beam interference regions. The plurality of pulsed lasers is directed at the exhaust region to improve fusion instances. The laser modulator 310 provides control of the waveforms of several pulsed lasers to create interference and superposition.

Figure 9:
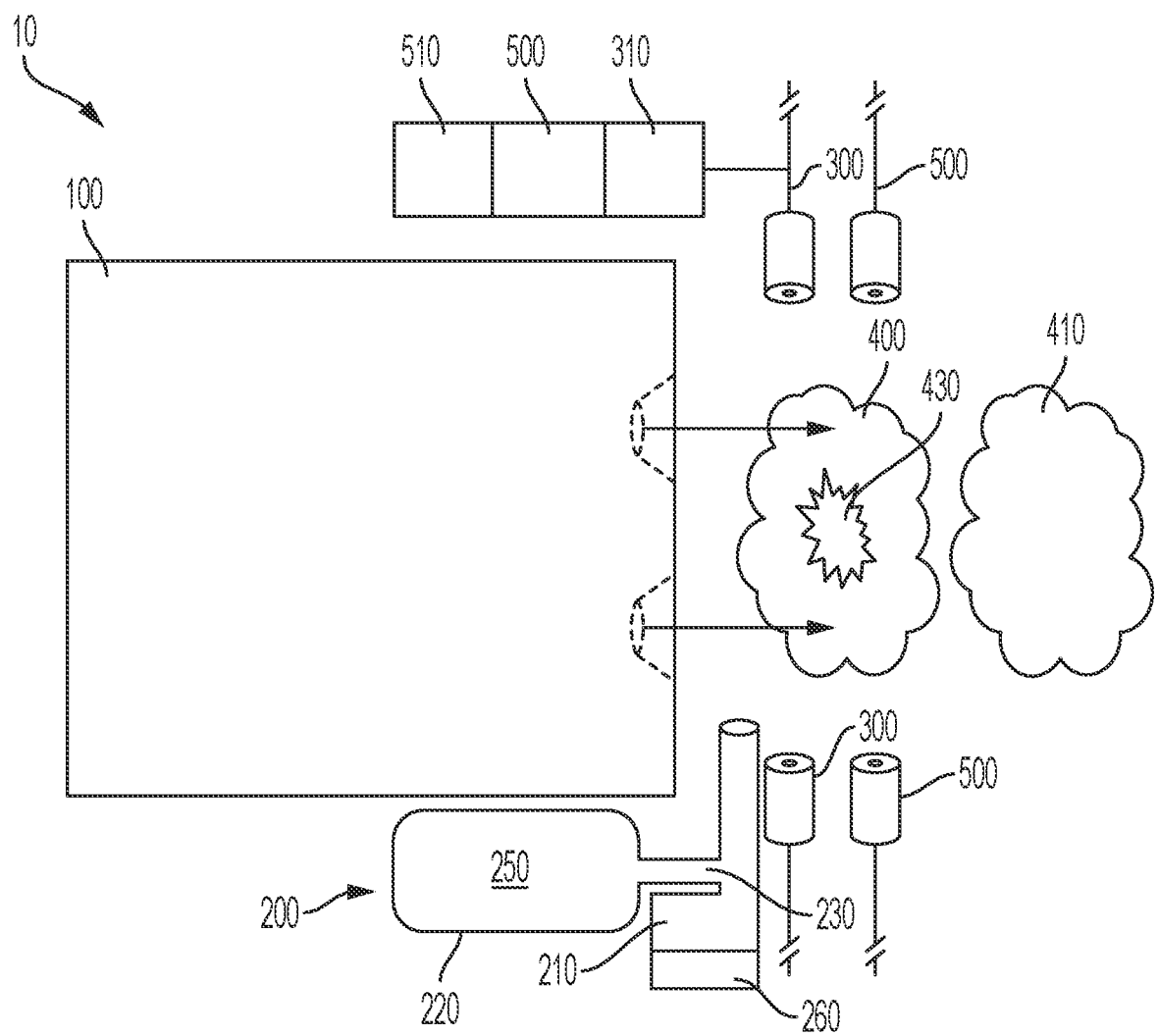
FIG. 9 is a conceptual diagram of a top view of an embodiment of an improved ion fusion thruster according to the invention, including a laser array, sensor, and feedback system.

As shown in FIG. 9, an alternative embodiment of the ion fusion thruster, according to the invention, is shown, including a sensor array 500 and feedback and machine learning system 510 can be provided for better control of the ion-fusion engine 100.

The sensor array 500 can include Geiger Muller detectors, hyperspectral sensors, Hall effect sensors, Langmuir probes, and temperature sensors, among other things.

The feedback and machine learning system 510 can be a programmable integrated circuit, ASIC, or more sophisticated computer with modifiable programming. Preferably the feedback machine learning system 510 includes a pre-programmed system software adapted to receive a plurality of inputs from the sensor array for measuring physical quantities to modulate several systems of the engine 100, including propellant vaporization modulator 180, fuel vaporization modulator 260, laser modulator 310, and even the DC potential across exhaust electrodes 140a-d. In a preferred embodiment, plasma production modulation is used to obtain a baseline of plasma behavior. Experiments of combinations with and without lasers and boron gather further sensor readings for calibrating and providing initial inputs to the machine learning system 510.

Since alpha particles are direct evidence of fusion, pancake-style Geiger Muller detectors with mica windows as well as silicon diode sensors, can sense alpha particles and are compact enough to be placed in close proximity to the plasma's fusion region. Hyperspectral sensors capture the plasma spectrographic signature. These sensors can include color cameras, UV detection diodes, and IR detection diodes.

In the water vapor-based ion thruster to be used, there is experimental evidence that input power varies linearly with the water vapor flow rate. The water vapor flow rate is known to vary with back pressure from the exhaust. The back pressure from the exhaust will change if fusion events change the exhaust's speed. Therefore, input power changes will be correlated to fusion events.

While modulation of fuel vaporization can be managed by the vaporization modulator 260 with a predetermined cycle for modulating the pulsed detonation of fusion reactions, a further embodiment receives information from the sensor array 500 and feedback and machine learning system 510 to alter the predetermined cycle in the vaporization modulator 260 to adapt to different conditions. For example, the sensor array 500 may determine and feedback system 510 may determine that an increase or decrease of boron injection is desirable. This modulation increases and decreases the rate of boron doping of the exhaust and, thus, the boron density and fusion rate. To test whether sensor output is caused by fusion, the sensor output is correlated in time to the modulation signal 260 for the fuel vaporizer. Feedback system 510 uses machine learning and statistical tests to determine if plasma behavior has changed in response to potential fusion events associated with alpha particle detector results.

Hall Effect sensors 500 can be placed axially proximate to the plasma flow; their outputs will be varied with the plasma pulses. Outputs from the Hall effect sensors 500 is provided to the feedback system 510, which calculates plasma velocity by correlating the timing of sensor information with geometry.

Figure 10:
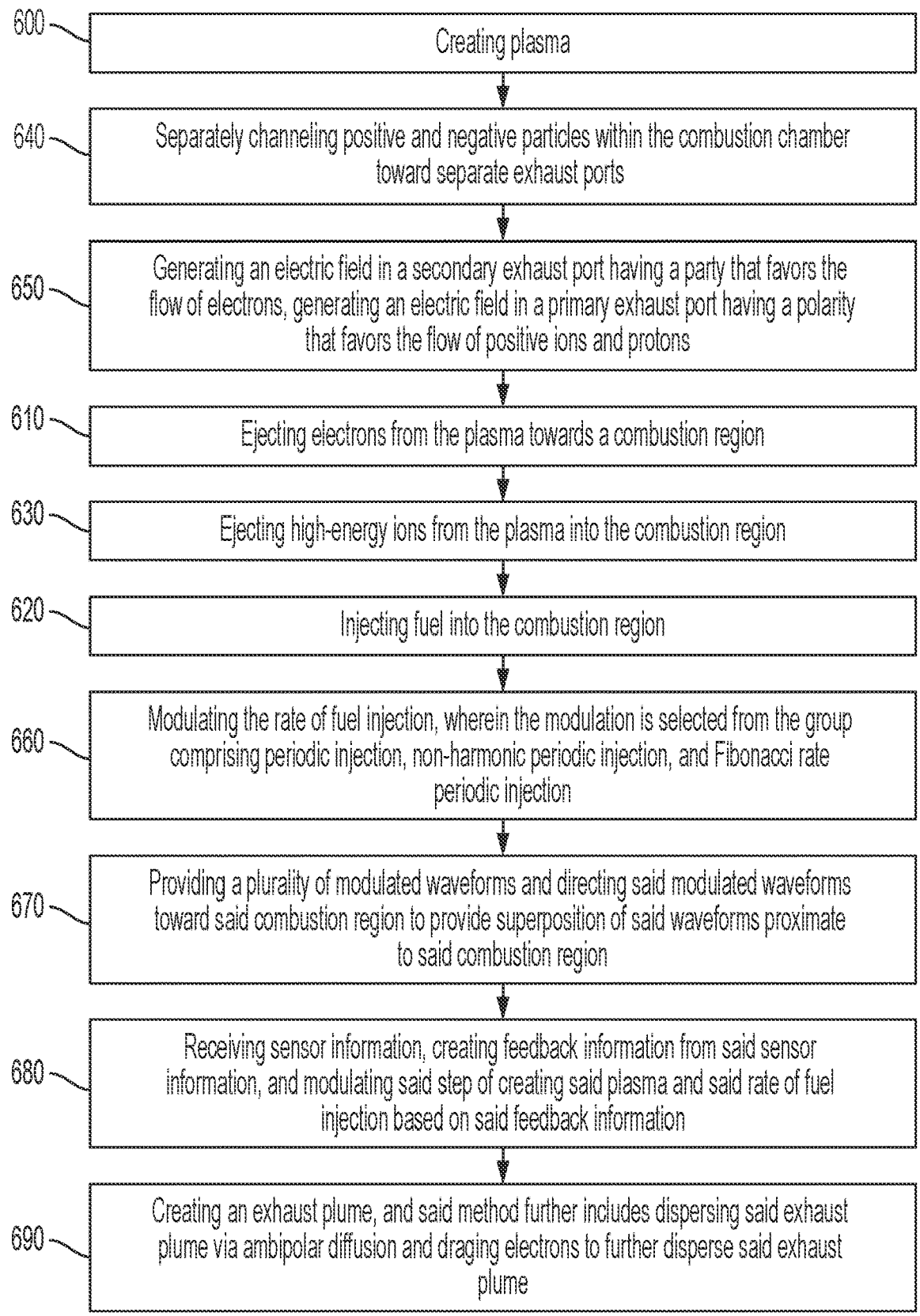
FIG. 10 is a conceptual diagram showing the steps of a method of providing ion fusion propulsion according to the invention.

A method according to the invention is also provided herein with respect to the above-described embodiments and shown in FIG. 10.

In one particular method, according to the invention, a method of providing fusion-ion propulsion includes the steps of creating a plasma 600, ejecting electrons from the plasma towards a reaction region 610, and thereby creating a virtual cathode, injecting fuel into the reaction region 620, and ejecting high-energy ions 630 from the plasma into the reaction region to promote instances of fusion events in the fuel. In alternative embodiments, the steps of injecting fuel 620 and ejecting ions 630 can proceed to each other and/or simultaneously with one another. Although the method described herein is presented in a sequential manner, it can be appreciated by a person of ordinary skill in the art that some of the steps may be simultaneous or near simultaneous and achieve the same effect. For example, as soon as the plasma is created, steps of ejecting electrons 610 and ejecting high-energy ion 630 may be present.

More particularly, a further method, according to the invention, is provided wherein the step of creating a plasma includes creating a plasma within a plasma chamber and separately channeling 640 positive and negative particles within the chamber toward separate exhaust ports.

In addition, and more particularly, a further method is provided wherein the step of ejecting electrons includes generating an electric field in a second exhaust port having a polarity that favors the flow of electrons, and wherein the step of ejecting high-energy ions includes generating an electric field in a first exhaust port having a polarity that favors the flow of positive ions and protons 650.

Furthermore, and more particularly, a further method according to the invention is provided wherein the step of injecting fuel includes modulating the rate of fuel injection, wherein the rate of fuel injection is selected from the group comprising periodic injection, non-harmonic periodic injection, and Fibonacci rate periodic injection 660.

A further method, according to the invention, includes providing a plurality of modulated waveforms and directing said modulated waveforms toward said reaction region to provide superposition of said waveforms proximate in the reaction region 670.

A further method, according to the invention, includes receiving sensor information, creating feedback information from said sensor information, and modulating said step of creating said plasma and said rate of fuel injection based on said feedback information 680.

A further and more particular method, according to the invention, is provided wherein the steps of ejecting electrons in the plasma and ejecting high-energy ions include creating an exhaust plume, and said method further includes dispersing said exhaust plume via ambipolar diffusion and dragging electrons to further disperse said exhaust plume 690.

Accordingly, the above-described ion fusion thruster 10 and a method of providing fusion-ion propulsion is provided herein, which leverages computational optimization and nuclear fusion to surpass the current limitations of state-of-the-art plasma thrusters to deliver a breakthrough in high delta-v spacecraft without a significant increase in propulsion system size, weight, power, complexity, or cost.

Where a range of values is provided, every intervening value between the upper and lower limit of that range and any other stated or intervening value in that stated range is included within the invention. The upper and lower limits of these smaller ranges may be included in the smaller ranges and are likewise included within the invention. Where the stated range includes one or both of the limits, ranges excluding either or both of those included limits are also included in the invention.

In the specification and in the appended claims, the singular forms "a," "and," "said," and "the" include plural referents unless the context clearly dictates otherwise. The claims may be so drafted to require singular elements or exclude any optional element. These statements provide an antecedent basis for the use of such exclusive terminology as "solely," "only," and the like in connection with the recitation of claim elements and/or the use of "negative" claim limitations.

While this invention has been described in conjunction with the exemplary embodiments outlined above, the foregoing description of exemplary embodiments of the invention is illustrative, not limiting. The invention is not necessarily so constrained. Many alternatives, adaptations, modifications, and or variations may be apparent to those skilled in the art in view of the teachings provided herein.

The invention claimed is:

1. An ion fusion thruster, comprising:
an ion plasma thruster comprising, a plasma chamber, a first exhaust port, and a second exhaust port, wherein said ion plasma thruster is adapted for creating a plasma from a propellant in said plasma chamber, wherein said first exhaust port and said second exhaust port are directed towards an exhaust region, and wherein the ion plasma thruster is adapted to provide a plasma exhaust plume at an exterior and rear portion of the ion plasma thruster, said plasma exhaust plume comprising a negatively charged particle flow from said second exhaust port and a positively charged particle flow from said first exhaust port, directed toward said exhaust region whereby an initial thrust is provided, and a fuel injector comprising a fuel reservoir, a vaporization chamber, a vaporizer, and a vapor exhaust port proximate to said first exhaust port and said exhaust region, wherein said fuel injector is adapted to vaporize a fuel thereby generating a vaporized fuel and direct said vaporized fuel into a reaction region proximate to said exhaust region into which said positively charged particle flow has been injected, and thereby promote a fusion reaction of said vaporized fuel and said positively charged particle flow whereby additional thrust is provided.

2. The ion fusion thruster, according to claim 1, wherein said fuel is selected from the group consisting of an aqueous solution of boron 10, an aqueous solution of boron 11, natural lithium, lithium 6, lithium 7, and helium.

3. The ion fusion thruster according to claim 1 wherein said propellant comprises at least one propellant selected from the group consisting of water, heavy water, and hydrogen peroxide.

4. The ion fusion thruster, according to claim 1, further comprising a modulated laser array disposed proximate to said first exhaust port and adapted to direct a plurality of modulated waveforms at said reaction region, wherein said modulated waveforms are further modulated ta create a constructive interference region at least within said reaction region.

5. The ion fusion thruster, according to claim 1, wherein said ion plasma thruster further comprises, a plurality of plasma generator electrodes, and a plurality of exhaust electrodes, wherein said plurality of exhaust electrodes include positive flow electrodes proximate to said first exhaust port, and negative flow electrodes proximate to said second exhaust port, whereby said ion plasma thruster separately ejects positively charged particles and negatively charged particles from said plasma chamber.

6. The ton fusion thruster, according to claim 1, wherein said vapor exhaust port is disposed between said first exhaust port and said second exhaust port and is directed toward said exhaust region whereby vaporized fuel is injected in a low-pressure region proximate to said exhaust region and between said first and second exhaust ports.

7. The ion fusion thruster, according to claim 1, further comprising a vaporization modulator and a plasma power modulator, said vaporization modulator having a predetermined modulation sequence, and said plasma power modulator adapted to produce plasma intermittently.

8. The ion fusion thruster, according to claim 6, wherein said vaporization modulator is adapted to modulate a fuel injection rate selected from the group comprising periodic injection, non-harmonic periodic injection, and Fibonacci rate periodic injection.

9. The ion fusion thruster, according to claim 6, further comprising a sensor array and a feedback and learning machine, wherein said sensor array includes sensors proximate to said reaction region and is adapted to provide sensor information to said feedback and learning machine, and wherein said feedback and learning machine is adapted to receive said sensor information, and process said sensor information to provide feedback information to at least said vaporization modulator and wherein said vaporization modulator is adapted to receive feedback information to modulate said fuel injection rate.

10. The ion fusion thruster, according to claim 1, wherein said ion plasma thruster is further adapted to provide an exhaust plume having energetic alpha particles directed to disperse and exhaust plume via ambipolar diffusion and to drag electrons to disperse said exhaust plume.

11. A method of providing ion fusion propulsion comprising the steps of creating a plasma, ejecting negatively charged particles from the plasma towards a reaction region to create a virtual cathode, ejecting high-energy positively charged particles from the plasma into the reaction region, the ejecting negatively charged particles and the ejecting high-energy positively charged particles generating an initial thrust, injecting fuel into said reaction region, wherein said ejecting high-energy positively charged particles from the plasma into the reaction region and said injecting fuel into said reaction region promotes instances of fusion events in the fuel thereby providing additional thrust.

12. The method of providing ion fusion propulsion, according to claim 11, wherein the step of injecting fuel and the step of ejecting negatively charged particle and the step of ejecting high-energy positively charged particles are at least contemporaneous.

13. The method of providing ion fusion propulsion, according to claim 11, wherein the step of creating a plasma includes creating a plasma within a plasma chamber and separately channeling positively and negatively charged particles within the chamber toward separate exhaust ports.

14. The method of providing ton fusion propulsion according to claim 11, wherein the step of ejecting negatively charged particles includes generating an electric field in a second exhaust port having a polarity that favors the flow of electrons, and wherein the step of ejecting high-energy positively charged particles includes generating another electric field in a first exhaust port having a polarity that favors the flow of high energy positive ions and protons.

15. The method of providing ion fusion propulsion according to claim 11 wherein the step of injecting fuel includes modulating a rate of fuel injection, wherein said rate of fuel injection is periodic.

16. The method of providing to fusion propulsion, according to claim 11, further comprising the step of providing a plurality of modulated waveforms and directing said plurality of modulated waveforms toward said reaction region to provide a superposition of said plurality of waveforms within said reaction region.

17. The method of providing ion fusion propulsion, according to claim 11, further comprising the steps of receiving sensor information, creating feedback information from said sensor information, and further modulating a rate of fuel injection based on said feedback information.

18. The method of providing ion fusion propulsion according to claim 11, wherein the steps of ejecting negatively charged particles in the plasma and ejecting high-energy positively charged particles includes rejecting low energy negatively charged particles and rejecting low energy positively charged particles, and creating an exhaust plume, and said method farther includes dispersing said exhaust plume via ambipolar diffusion and dragging negatively charged particles to further disperse said exhaust plume.

19. The method of providing ion fusion propulsion according to claim 11 wherein the step of injecting fuel includes modulating a rate of fuel injection, wherein said rate of fuel injection is selected from the group comprising non-harmonic periodic injection, and Fibonacci rate periodic injection.

20. An ion fusion thruster, comprising:
an ion plasma thruster comprising, a plasma chamber, a first exhaust port, and a second exhaust port, wherein said ion plasma thruster is adapted for creating a plasma from a propellant in said plasma chamber, wherein said first exhaust port and said second exhaust port are directed towards an exhaust region, and wherein the ion plasma thruster is adapted to provide a plasma exhaust plume at an exterior and rear portion of the ion plasma thruster, said plasma exhaust plume comprising a negatively charged particle flow from said second exhaust port and a positively charged particle flow from said first exhaust port, wherein said exhaust plume is directed toward said exhaust region whereby an initial thrust is provided, and a fuel injector comprising a fuel reservoir, a vaporization chamber, a vaporizer, and a vapor exhaust port proximate to said first exhaust port and said exhaust region, wherein said fuel injector is adapted to vaporize a fuel thereby generating a vaporized fuel, and direct the vaporized fuel into a reaction region proximate to said exhaust region into which said positively charged particle flow has been injected, and thereby promote a fusion reaction of said vaporized fuel and said positively charged particle flow whereby additional thrust is provided.

\* \* \* \* \*